United States Patent
Baschek et al.

(10) Patent No.: US 8,617,755 B2
(45) Date of Patent: Dec. 31, 2013

(54) FUEL CELL AND HEATING DEVICE OF A FUEL CELL

(75) Inventors: Günter Baschek, Engelskirchen (DE); Arno Mattejat, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 1485 days.

(21) Appl. No.: 10/558,169

(22) PCT Filed: Apr. 16, 2004

(86) PCT No.: PCT/EP2004/004066
§ 371 (c)(1),
(2), (4) Date: Nov. 22, 2005

(87) PCT Pub. No.: WO2004/107486
PCT Pub. Date: Dec. 9, 2004

(65) Prior Publication Data
US 2007/0015019 A1    Jan. 18, 2007

(30) Foreign Application Priority Data
May 26, 2003  (DE) .................................. 103 23 882

(51) Int. Cl.
*H01M 8/04*    (2006.01)
*F28F 3/04*    (2006.01)

(52) U.S. Cl.
USPC .............................. 429/434; 429/514; 165/166

(58) Field of Classification Search
USPC ........... 429/433–439, 512, 514; 165/166, 167
See application file for complete search history.

(56) References Cited

U.S. PATENT DOCUMENTS

| | | | | |
|---|---|---|---|---|
| 2,281,754 A * | 5/1942 | Dalzell | ......................... | 165/167 |
| 4,569,391 A * | 2/1986 | Hulswitt et al. | .............. | 165/166 |
| 4,649,091 A | 3/1987 | McElroy | | |
| 4,678,724 A | 7/1987 | McElroy | | |
| 5,472,801 A * | 12/1995 | Mattejat et al. | ................. | 429/39 |
| 6,080,502 A | 6/2000 | Nölscher et al. | | |
| 6,490,778 B1 * | 12/2002 | Funatsu et al. | .................. | 29/557 |
| 7,195,837 B2 * | 3/2007 | Suzuki et al. | ................... | 429/34 |
| 7,468,217 B2 * | 12/2008 | Mizuno | .......................... | 429/38 |
| 2002/0187379 A1 * | 12/2002 | Yasuo et al. | ..................... | 429/34 |
| 2003/0162078 A1 * | 8/2003 | Kikuchi et al. | ................. | 429/38 |
| 2004/0161658 A1 * | 8/2004 | Mizuno | .......................... | 429/38 |

FOREIGN PATENT DOCUMENTS

| | | |
|---|---|---|
| DE | 697 05 016 T2 | 7/1998 |
| DE | 19835759 A1 | 2/2000 |
| DE | 103 21 916 A1 | 2/2004 |

(Continued)

OTHER PUBLICATIONS

"embossing." © Encyclopedia Britannica, Inc.. Encyclopedia Britannica, Inc.. Dec. 22, 2010. <Dictionary.com http://dictionary.reference.com/browse/embossing>.*

*Primary Examiner* — Edu E Enin-Okut

(57) ABSTRACT

The invention relates to a fuel cell comprising a separator, plate that is positioned between electrolyte-electrode units, said plate consisting of two embossed panels with contact surfaces that rest against one another. A fluidic chamber for a coolant is configured between the two pans and a fluidic chamber for a gas is configured between each panel and the respective adjacent electrolyte-electrode unit. The fluidic chamber for the coolant comprises two sub-chambers, each facing a respective panel, and said coolant traverses the fluidic chamber exclusively in an alternate manner through the two sub-chambers.

12 Claims, 3 Drawing Sheets

(56) References Cited

FOREIGN PATENT DOCUMENTS

| | | |
|---|---|---|
| EP | 0 851 518 A1 | 7/1998 |
| EP | 0 978 891 A2 | 2/2000 |
| EP | 0 876 686 B1 | 3/2000 |
| EP | 1 009 051 A2 | 6/2000 |
| JP | 06231793 A | 8/1994 |
| JP | 10308227 A | 11/1998 |
| JP | 2003272698 A * | 9/2003 ............ H01M 8/24 |
| WO | 0031815 A1 | 6/2000 |
| WO | WO 02/075833 A2 | 9/2002 |

* cited by examiner

FUEL CELL AND HEATING DEVICE OF A FUEL CELL

CROSS REFERENCE TO RELATED APPLICATIONS

This application is the US National Stage of International Application No. PCT/EP2004/004066, filed Apr. 16, 2004 and claims the benefit thereof. The International Application claims the benefits of German application No. 10323882.4, filed May 26, 2003, both applications are incorporated by reference herein in their entirety.

FIELD OF INVENTION

The invention relates to a fuel cell with a separator which is disposed between electrolyte-electrode units and through which a coolant can flow. A fuel cell of this type is known e.g. from EP 0 876 686 B1. The invention additionally relates to a heating device for a fuel cell.

SUMMARY OF THE INVENTION

The fuel cell known from EP 0 876 686 B1 has a separator which is disposed between two electrolyte-electrode units in each case and which separates three flow chambers from one another, namely a gas chamber bordering an anode of a first electrolyte-electrode unit, a gas chamber bordering a cathode of a second electrolyte-electrode unit and a coolant chamber for a fluid coolant, the coolant chamber being delimited by a separator consisting of a unit comprising two plates overlying one another. In addition to directing the flow, the separator has the task of establishing an electrical connection between the opposite electrolyte-electrode units. The more extensive the contact surfaces between the individual plates of the separator, the higher the conductance of the electrical connection formed by the separator between the adjacent electrolyte-electrode units. However, coolant flow is restricted by large-area contacting of the two plates.

The object of the invention is to specify a fuel cell which meets, to a particularly large extent, the competing requirements for a separator in respect of cooling on the one hand and electrical properties on the other. The object of the invention is additionally to specify a particularly suitable heating device for a fuel cell, in particular for a humidifier unit of a fuel cell.

This object is achieved by a fuel cell and by a heating device according to the claims. The fuel cell has, in the essentially known manner, two parallel opposite electrolyte-electrode units between which there is disposed a separator which separates three fluid chambers, namely two gas chambers facing the electrolyte-electrode units in each case and a cooling chamber formed between abutting embossed plates of the separator. This cooling chamber, specifically for a fluid coolant, is subdivided into two subchambers each facing a plate and therefore facing an electrolyte-electrode unit in each case.

An imaginary parting plane between the subchambers intersects the separator preferably centrally and parallel to the adjacent electrolyte-electrode units. The two embossed plates of the separator are preferably interconnected at contact surfaces in the parting plane. However, the contact surfaces are not necessarily disposed in a single plane and not necessarily oriented parallel to the electrolyte-electrode units.

In each case the coolant chamber is implemented in such a way that the coolant can flow through the separator solely on flow paths which consecutively intersect the two subchambers. In other words: the coolant flows through the two subchambers alternately, each particle of coolant flowing through the separator preferably changing several times between the two subchambers. The enforced flow from one subchamber of the coolant chamber to the other subchamber produces good intermixing of the coolant in the coolant chamber as well as good heat transfer between the separator surfaces facing the electrolyte-electrode units and the coolant. The temperature gradients between adjacent electrolyte-electrode units are therefore minimized. The contact surfaces between the individual plates of the separator are located not only on the edge of the separator but also inside the generally rectangular surface of the separator. These inner contact surfaces serve not only to direct coolant within the subchambers, but are also used for electrical contacting between the individual plates. The electric current between spaced electrolyte-electrode units is therefore spread over a plurality of contact surfaces within the separator. The contact surfaces are preferably distributed at least approximately uniformly over the surface of the separator. In this way, regions of increased current density and therefore increased heat dissipation are avoided or at least minimized.

According to preferred embodiments, the plates overlying one another have virtually identical embossings. According to a first preferred embodiment, these are essentially circular, in the manner of dimples. The dimples can likewise be e.g. polygonal or any other shape. The plates having a dimpled pattern are offset relative to one another so that flow paths for the coolant are created between the plates. At least one of the plates does not have a plane of symmetry of the dimpling that is identical to the plane of symmetry of the separator disposed perpendicularly to the electrolyte-electrode units. Provided that both dimple patterns of the plates have their own plane of symmetry—perpendicular to the plate—these planes of symmetry are offset to one another.

According to another preferred alternative, the embossings of the plates are implemented in a rib-shaped manner. In this case the ribs of the two plates are rotated or mirrored relative to one another in the plate plane in order to create flow paths for the coolant. The individual ribs are not necessarily straight. In this case also, any existing plane of symmetry of the embossing pattern of at least one plate is not identical to the generally preexisting plane of symmetry of the plate, particularly in the case of a fuel cell of rectangular construction.

In order to achieve a particularly low electrical resistance between the plates overlying one another, their contact surfaces are preferably provided with a suitable coating, specifically electrodeposited, preferably gold-plated. The total surface area of the contact surfaces between the plates is preferably at least 10%, specifically at least 20%, of the total fluid-receiving surface area of the separator. In order to allow a sufficiently low-resistance coolant flow in the separator, the contact surfaces preferably have a surface area of not more than the 90%, specifically not more than 80%, of the total separator surface area.

A heating device according to the invention for a fuel cell block, particularly for a humidifier of the inventive fuel cell, has a heating element as a flow directing element which is basically constructed according to the separator of the fuel cell. The heating device is laterally bounded by edge plates instead of electrolyte-electrode units. The further developments and advantages described in connection with the fuel cell apply, with the exception of the electrical characteristics, equally to the heating device. The heating medium can be routed either inside or outside the flow chamber formed between the plates. The medium to be heated is in the other flow chamber or flow chambers in each case.

The particular advantage of the invention is that two separator-forming plates of a fuel cell are connected in such a way that current conduction perpendicular to the electrolyte-electrode units of the fuel cell is made possible not only in the frame-shaped edge region but also in the inner region of the separator, causing the separator to have a particularly low electrical resistance distributed virtually uniformly over the surface, a flow channel for the coolant being simultaneously created by the disposition of the generally regularly disposed raised features or depressions in the plates and in the contact surfaces between the plates, which channel alternately borders on the two opposite surfaces of the separator, thereby allowing intensive and uniform heat dissipation from the adjacent electrolyte-electrode units. In a particularly rational manner, a heat transfer device with a construction corresponding to the separator is simultaneously used as a heating element for a humidifier of the fuel cell.

A number of exemplary embodiments of the invention will now be explained in greater detail with reference to the accompanying drawings.

BRIEF DESCRIPTION OF THE DRAWINGS

Equivalent parts are identified by identical reference numerals in all the Figures.

DETAILED DESCRIPTION OF INVENTION

Figure 1:
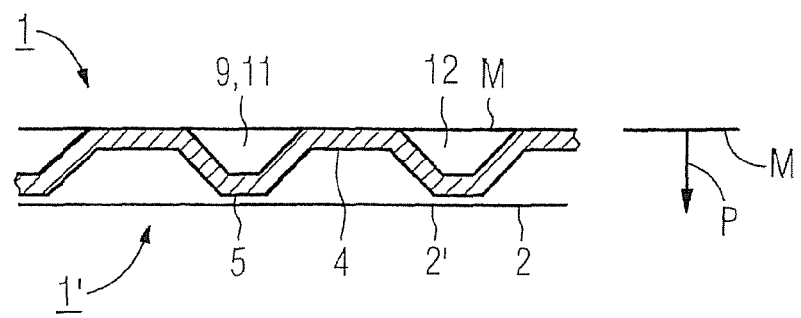
FIG. 1 shows an embossed plate as part of a separator of a fuel cell.
Figure 2:
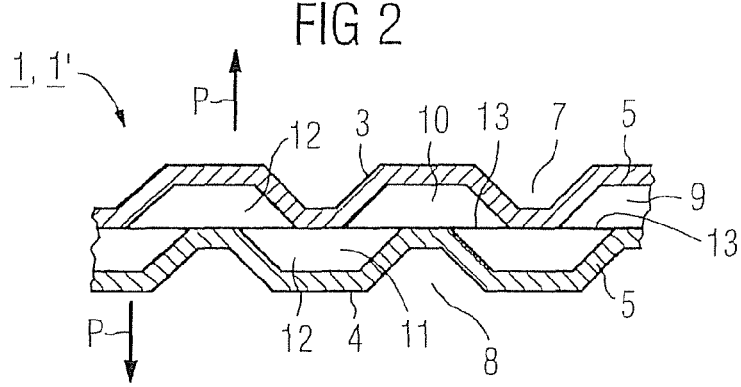
FIG. 2 shows a separator constructed from two embossed plates.
Figure 3:
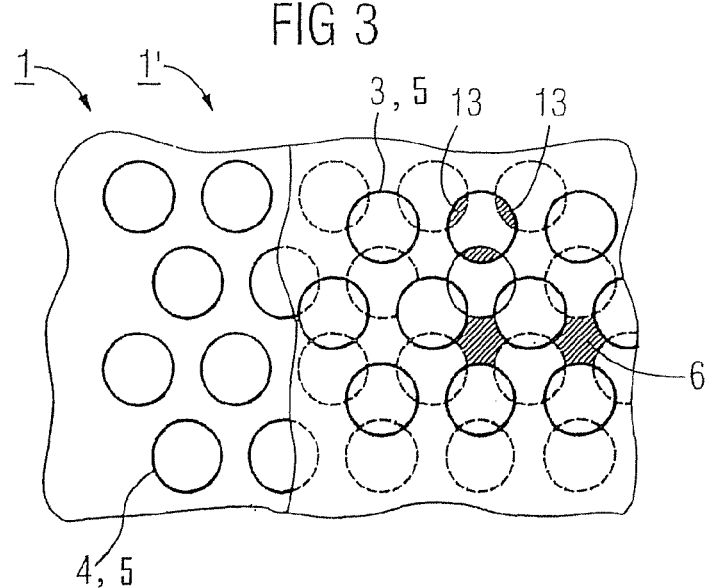
FIG. 3 shows a partially truncated plan view of the separator according to FIG. 2.

FIGS. 1 to 3 show details, in cross section or plan view, of a separator 1 of a fuel cell (not shown) known in principle from e.g. EP 0 876 686 B1. An electrolyte-electrode unit 2 adjacent to the separator 1, which is formed from assembled plates 3,4, is only indicated in FIG. 1. Each plate 3,4 has an embossing 5 in the form of a dimpled pattern, the embossing direction P of the bottom plate 4 in FIG. 2 being opposite to the embossing direction of the upper plate 3. The original plane of the plates 3,4 forms a center plane M. In the center plane M, the plates 3,4 are electrically interconnected at contact surfaces 6, as is particularly apparent from FIG. 3. The individual, mutually separated contact surfaces 6 are, as is further apparent from FIG. 3, uniformly distributed over the surface of the separator 1.

The separator 1 disposed between adjacent electrolyte-electrode units 2 delimits three fluid chambers 7,8, 9, namely a gas chamber 7,8 bordering an electrolyte-electrode unit 2 in each case as well as a coolant chamber 9 disposed between the plates 3,4 for a fluid coolant, particularly water. The coolant chamber 9 is divided into two subchambers 10,11 bordering one another on the central plane M and which are formed from a plurality of dimple-shaped depressions 12. It is possible for coolant to flow through the separator 1 parallel to the center plane M, as the plates 3,4 are offset relative to one another in such a way that the depression 12 of a plate 3,4 is connected in each case to three depressions 12 of the opposite plate 4,3 by an overflow section 13, thereby forming a reticulated cooling chamber structure covering the entire surface of the separator 1. When coolant flows from a depression 12 of a plate 3,4 into the opposite plate 4,3, the coolant is automatically directed from one subchamber 10,11 to the opposite subchamber 11,10. The coolant therefore continuously undergoes a change of direction perpendicular to the separator 1. In addition, the coolant is also continuously diverted in directions parallel to the center plane M by the offset arrangement of the depressions 12. Each particle of the coolant therefore describes a three-dimensional flow trajectory, in a manner comparable to the flow in a pebble bed, for example. All in all, this provides a very uniform intermixing of the coolant within the separator 1 as well as a very good heat transfer performance between the electrolyte-electrode units 2 and the coolant. Even if coolant is introduced into the separator 1 at one location only, it is distributed widthwise within a short distance. Flow takes place with a uniform flow resistance within the surface of the separator 1. There is no need for any distributor elements or spacers between the plates 3,4 or between adjacent electrolyte-electrode units 2. The absence of such components, in addition to the interleaved arrangement of coolant chamber 9 and gas chambers 7,8 which is provided by the dimpled pattern of the plates 3,4, contributes to the particularly narrow design of the fuel cell, the temperature distribution in the center plane M being very uniform in spite of the absence of flow-directing components in addition to the separator 1, also known as a bipolar plate or cooling card. This contributes to a very high achievable output and high efficiency of the fuel cell. The realizable manufacturing precision further contributes thereto. High precision is facilitated by the fact that, in the manufacturing process, the separator plates 1 can be inserted between the electrolyte-electrode units 2 in a distortion-free manner, without soldering.

The abovementioned advantages of the separator 1 likewise apply when it is used as a heating element or heating register in a heating device of a humidifier for the fuel cell. All the Figures also show the structure of a heating element 1'. In this case, either the fluid chamber 9 disposed between the plates 3,4 or at least one of the fluid chambers 7,8 disposed outside the plates 3,4 acts as a heating medium chamber through which a heating medium flows. The medium to be heated is in at least one of the fluid or flow chambers 7,8,9. The arrangement is bounded by edge plates 2' instead of the electrolyte-electrode units 2.

When the separator 1 is used in a fuel cell, the separator 1 also serves to establish the electrical connection between adjacent electrolyte-electrode units 2. The electric current flows perpendicularly to the center plane M through the plates 3,4 and the contact surfaces 6. Due to the uniform and altogether large-area distribution of the contact surfaces 6 inside the separator plate 1, an electrical connection with short current paths and very low resistance is provided. To improve conductance, the contact surfaces 6 of the plates 3,4 are gold-plated. The low dissipation in addition to the even distribution of the current flow via the separator 1 contributes to a high output and a high degree of efficiency of the fuel cell.

Figure 4:
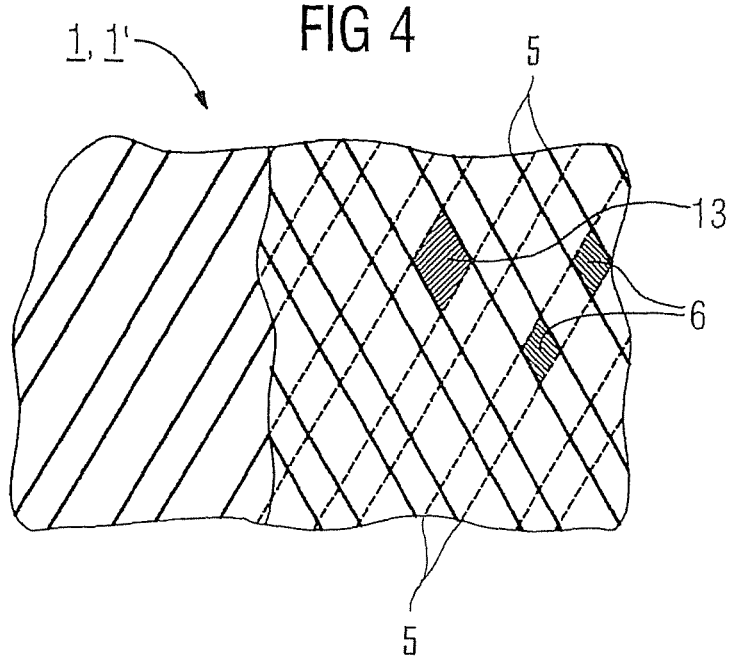
FIG. 4 shows a separator plate with a rib-shaped embossing pattern in a view similar to FIG. 3.

FIG. 4 shows an alternative embodiment of a separator 1. In this case the embossing 5 has a ribbed structure. The pattern of the embossings 5 of the two plates 3,4 emerges by rotating them apart in the center plane M. The advantages mentioned in connection with the exemplary embodiment according to FIGS. 1 to 3 in respect of coolant distribution and current conduction similarly apply.

Figure 5:
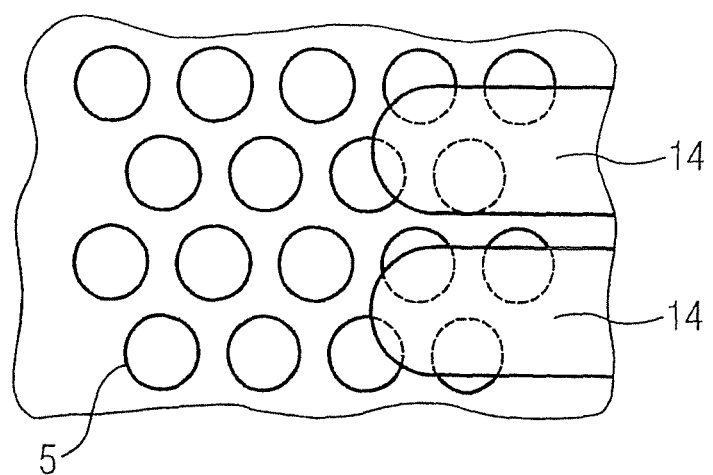
FIG. 5 shows a section of a separator with coolant connecting channels.

The separator 1 shown in FIG. 5 is constructed according to the example illustrated in FIGS. 1 to 3. Additionally visible in FIG. 5 are depressions 14 forming tubular chambers for the connection of a radial channel (not shown) for the coolant. Corresponding depressions which likewise establish connections to channels (not shown) running perpendicular to the drawing plane, are also located on the (in the drawing) left-hand side of the separator 1. The depressions 14 in the plate 3,4 do not increase their thickness, or do not do so substantially. The flow direction of the coolant in the coolant chamber 9 can bear any angular relation to the flow directions of the gases, specifically hydrogen and oxygen, in the gas chambers 7,8.

Figure 6:
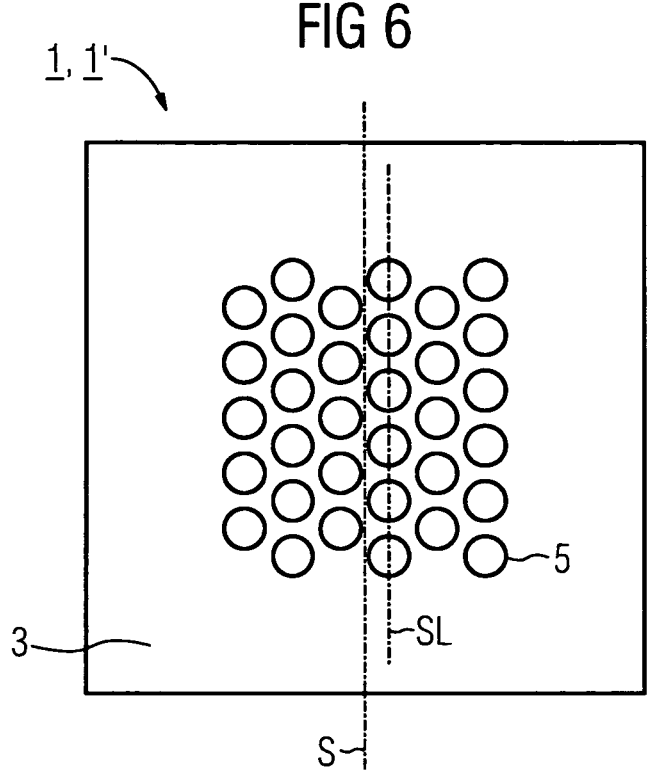
FIG. 6 shows an overall view of a separator plate embossed in a dimpled pattern.
Figure 7:
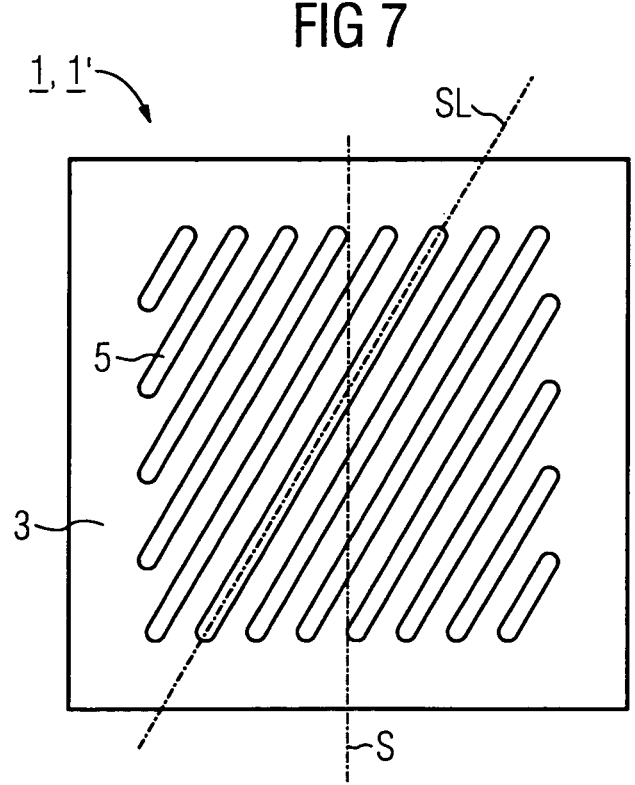
FIG. 7 shows an overall view of a separator plate embossed in a ribbed pattern.

FIGS. 6 and 7 illustrate general features of the embossings 5 of the plates 3,4 on the basis of an exemplary embodiment with a dimpled and a rib-shaped embossing 5 respectively. In both exemplary embodiments a line of symmetry S of the rectangular separator 1 is marked. The embossing 5 disposed on the side of the separator 1 facing away from the observer (not visible in the drawings) is implemented symmetrically with respect to the line of symmetry S in each case. On the other hand, the embossing 5 (visible in the drawings) on the plate-3 facing the observer, as identifiable on the basis of an embossing line of symmetry SL, is displaced (FIG. 6) or deformed (FIG. 7) relative to the line of symmetry S. Unlike in the exemplary embodiments, the plates 3,4 can also have differently patterned and/or dimensioned embossings 5.

The invention claimed is:

1. A fuel cell, comprising a separator disposed between two electrolyte-electrode units, wherein
the separator is formed from two plates, a first and a second plate, each plate having embossings, and the plates touching each other at contact surfaces, wherein the embossings are formed as circular depressions, and wherein the embossings of the plates are offset relative to one another such that one circular depression of the first plate is connected to three circular depressions of the second plate by an overflow section, thereby forming a reticulated cooling chamber structure covering an entire surface of the separator;
a first fluid chamber for a coolant is formed between the two plates and a second fluid chamber for a gas is formed between each plate and an adjacent electrolyte-electrode unit in each case; and
the first fluid chamber for the coolant has two subchambers, each subchamber facing one of the two plates, where the subchambers are arranged adjacent and non-planar to each other and are separated by a central plane comprising an overflow section configured to direct the coolant flow alternately through the two non-planar subchambers.

2. The fuel cell according to claim 1, wherein the plates have approximately identical embossings.

3. The fuel cell according to claim 1, wherein the contact surfaces are gold-plated.

4. The fuel cell according to claim 2, wherein the contact surfaces are gold-plated.

5. The fuel cell according to claim 1, wherein the contact surfaces are distributed approximately uniformly over the surface of the separator.

6. The fuel cell according to claim 2, wherein the contact surfaces are distributed approximately uniformly over the surface of the separator.

7. The fuel cell according to claim 1, wherein the total surface area of the contact surfaces is at least 10% of the surface area of the separator.

8. The fuel cell according to claim 2, wherein the total surface area of the contact surfaces is at least 10% of the surface area of the separator.

9. The fuel cell according to claim 1, wherein the total surface area of the contact surfaces is no more than 90% of the surface area of the separator.

10. The fuel cell according to claim 2, wherein the total surface area of the contact surfaces is no more than 90% of the surface area of the separator.

11. A heating device of a fuel cell, comprising:
a flow directing element disposed between opposite edge plates, wherein the flow directing element is formed as a heating element from two plates, a first and a second plate, each plate having embossings, and the plates touching each other at contact surfaces, wherein the embossings are formed as circular depressions, and wherein the embossings of the plates are offset relative to one another such that one circular depression of the first plate is connected to three circular depressions of the second plate by an overflow section, thereby forming a reticulated cooling chamber structure covering an entire surface of the separator; and
a flow chamber being formed between the heating element and an edge plate in each case and another flow chamber being foinied between the plates, the last mentioned flow chamber having subchambers, each subchamber facing a plate and comprising an overflow section configured to provide a flow path solely on an alternating basis.

12. The heating device according to claim 11, wherein the fuel cell includes:
a separator disposed between two electrolyte-electrode units, wherein
the separator is fanned from two plates, a first and a second plate, each plate having embossings, and the plates touching each other at contact surfaces, wherein the embossings are formed as circular depressions, and wherein the embossings of the plates are offset relative to one another such that one circular depression of the first plate is connected to three circular depressions of the second plate by an overflow section, thereby forming a reticulated cooling chamber structure covering an entire surface of the separator;
a first fluid chamber for a coolant is formed between the two plates and a second fluid chamber for a gas is formed between each plate and an adjacent electrolyte-electrode unit in each case; and
the first fluid chamber for the coolant has two subchambers, each subchamber facing one of the two plates, where the subchambers are arranged adjacent and non-planar to each other and are separated by a central plane comprising an overflow section configured to direct the coolant flow alternately through the two non-planar subchambers.

* * * * *